(12) United States Patent
Marsland

(10) Patent No.: US 7,691,430 B2
(45) Date of Patent: Apr. 6, 2010

(54) FOOD MATERIAL TECHNOLOGY WITH CONTROLLABLE FUNCTIONAL CHARACTERISTICS AND INDUSTRIAL PROCESS APPLICATIONS, AND THE RESULTING FABRICATED FOODS

(75) Inventor: Charles H. Marsland, Sudbury, MA (US)

(73) Assignee: Medwell Foods, Inc., Danvers, MA (US)

( * ) Notice: Subject to any disclaimer, the term of this patent is extended or adjusted under 35 U.S.C. 154(b) by 372 days.

(21) Appl. No.: 10/288,854

(22) Filed: Nov. 6, 2002

(65) Prior Publication Data
US 2003/0091698 A1 May 15, 2003

Related U.S. Application Data

(60) Provisional application No. 60/345,186, filed on Nov. 7, 2001.

(51) Int. Cl.
*A23J 3/18* (2006.01)
(52) U.S. Cl. .................. 426/656; 426/496; 426/549; 426/804
(58) Field of Classification Search .................. 426/549, 426/656, 496, 804
See application file for complete search history.

(56) References Cited

U.S. PATENT DOCUMENTS

| 4,759,934 | A | * | 7/1988 | Ferrara | 426/21 |
| 5,320,859 | A | * | 6/1994 | Namdari | 426/551 |
| 5,977,312 | A | * | 11/1999 | Bassi et al. | 530/374 |

* cited by examiner

*Primary Examiner*—Lien Tran
(74) *Attorney, Agent, or Firm*—Brian M. Dingman; Mirick, O'Connell, DeMallie & Lougee, LLP

(57) ABSTRACT

A novel high-protein, reduced carbohydrate food material technology, and high-protein, reduced carbohydrate food products made therefrom, in which the food products meet high organoleptic, stability, and taste/texture standards. This novel material technology possesses numerous controllable functional characteristics, including high to low adhesion, high to low volume expansion, high to low tensile strength, and high to low break elongation, all of which are critical to both processing needs as well as final food product specifications. The material technology allows for the processing of proteinaceous foods on common process equipment, the foods including but not limited to chips, snacks, crackers, wafers, bars, flat breads, cookies, biscuits, breads, bagels, cakes, waffles, pancakes, french fries, pasta, pizza dough, breakfast cereals, muffins, doughnuts, pastries, and meat analogs. The material is an edible dough that possesses the material characteristics necessary for numerous industrial food processes, including direct reduction sheeting, lamination sheeting, extrusion, die cutting, and rotary molding, followed by on or more of baking, drying, microwaving, boiling, steaming, frying, seasoning, and enrobing.

19 Claims, No Drawings ially scale equipment. Additionally, this material technology must be balanced, for it needs to not only meet the requirements of the equipment, but it must ultimately yield a food product with taste, texture and mouth-feel characteristics similar to existing carbohydrate-based food products.

FOOD MATERIAL TECHNOLOGY WITH CONTROLLABLE FUNCTIONAL CHARACTERISTICS AND INDUSTRIAL PROCESS APPLICATIONS, AND THE RESULTING FABRICATED FOODS

CROSS-REFERENCE TO RELATED APPLICATION

This application claims priority of Provisional patent application Ser. No. 60/345,186, filed on Nov. 7, 2001.

FIELD OF THE INVENTION

The invention relates to a novel proteinaceous material and foods made from the material, wherein the material has controllable functional characteristics including high to low adhesion, high to low tensile strength, high to low volume expansion, and high to low elongation strength.

BACKGROUND OF THE INVENTION

Many food products, including but not limited to chips, bars, snacks, crackers, wafers, flat breads, cookies, biscuits, breads, bagels, cakes, muffins, waffles, pancakes, french fries, meat analogs, pasta, pastries, and doughnuts, have developed/evolved over the centuries with a focus on carbohydrate-based material formulations. This focus on carbohydrates (including but not limited to flour, sugar, starch, and derivatives of such) and their functional properties has had a major impact on manufacturing processes and equipment. Equipment materials of construction, equipment design, material handling requirements and systems, process design, recipe creation and product formulation have all developed around carbohydrate-based product formulation. Most importantly, though, these carbohydrate-based product formulations have made a permanent impact on the mind of the consumer regarding food product taste, texture, and mouth-feel. Unfortunately, this focus on carbohydrate-based foods has also had other unwanted consequences, including an out-of-control increase in obesity, irritable bowel syndrome, diabetes, and lethargy. Many of these diseases are scientifically linked to the high-carbohydrate diet common in the western hemisphere.

As a result, the need for changes to the high-carbohydrate diet has become critical for the general publics' long-term health and wellness. The difficulty with enacting the necessary product formulation changes is that a change in food ingredients is usually not simple, nor just an easy substitution of one ingredient for another. Foods must still be palatable and digestible, and the products must be capable of being successfully processed on existing manufacturing equipment, ranging from home kitchen appliances to large industrial scale equipment. Additionally, this material technology must be balanced, for it needs to not only meet the requirements of the equipment, but it must ultimately yield a food product with taste, texture and mouth-feel characteristics similar to existing carbohydrate-based food products.

Any new food material technology would thus need to be multifunctional, requiring it to both process and taste similar to carbohydrates. Also, in order to be processed, such foods would need to emulate the material characteristics exhibited by high-carbohydrate foods, including possessing controllable extensibility/elongation, volume expansion, and adhesion properties needed to be processable in common food manufacturing processes, including direct reduction sheeting, lamination sheeting, extrusion, and various molding processes. The processed food materials need to be physically subjected to equipment handling, various extrusion techniques, and thickness reduction methods on automated process equipment to measurements ranging from 300 mm to as little as 0.10 mm. Standard carbohydrate materials technology, used for these common food processes, has been mastered over centuries of engineering, work, and effort. Therefore, these processes and the equipment have been designed for processing of high-carbohydrate products. There is thus a great need for a material base change in food processing which will yield good tasting, economical, high-protein, reduced high glycemic/simple carbohydrate foods.

SUMMARY OF THE INVENTION

The invention relates generally to a novel proteinaceous food material technology. The material has controllable, engineered process-related functionality, including high to low break elongation, high to low tensile strength, high to low expansion, and high to low adhesion. The material also possesses good die cutting characteristics, molded form retention, is edible, and forms a protein-based dough-like material when blended with water that is processable much like a high-carbohydrate dough. The material can be formulated to work within numerous existing food process systems, including direct reduction sheeting, lamination sheeting, single and twin screw extrusion, die cutting, and molding processes followed by baking, drying, boiling, steaming, frying, seasoning, enrobing, and/or a combination of such. The final fabricated food mimics a high-carbohydrate food product such as chips, bars, snacks, crackers, wafers, flat breads, cookies, biscuits, breads, bagels, cakes, french fries, waffles, pancakes, muffins, meat analogs, pasta, pastries, and doughnuts.

This novel material technology is based on the utilization of a modified non-viscoelastic wheat protein isolate, in combination with other desirable proteinacious materials, optional low to moderate percentage levels of select carbohydrates, a liquid source, and in some cases amounts of fats. The proteinaceous material technology is edible, and when mixed with water or other liquids, forms a dough-like food material. This dough-like food material's controllable functionality is based on the amount of the modified non-viscoelastic wheat protein isolate relative to the other formulation ingredients. The relative amount of the modified non-viscoelastic wheat protein isolate directly imparts the controllable functional characteristics, useful both for processing and in the final product. These controllable functional characteristics include high to low elongation, high to low tensile strength, high to low volume expansion, high to low adhesion, die cutting characteristics, and molded form retention. The control of these functional characteristics, particularly in the break elongation, plays a major role in the processing of the raw material. These characteristics also play a role in the texture, shape/look, nutritional profile, and organoleptics of the final food products.

The novel material engineering plays a critical role in all stages of numerous food process systems ranging from kitchen scale through to the largest industrial scale operations. However, the materials of this invention are particularly engineered for the equipment of large, industrial-scale processing systems that have been designed to process high-carbohydrate foods. The properties for which these processes are designed include elongation control, tensile strength, adhesion control, volume expansion control, mixing, molded-form retention, die cutting/dockering and release, and the ability to be pumped.

The relative ratio of modified non-viscoelastic wheat protein isolate to co-ingredients creates in the raw material the different carbohydrate-like characteristics. The data set forth below demonstrates control of elongation by variation of the amount of modified non-viscoelastic wheat protein isolate.

Examples of non-viscoelastic modified wheat protein isolate for the invention include an isolated source that is greater than 70% protein measured on a dry basis using the common measurement formula: N×6.25. This invention can be accomplished with chemically and/or enzymatically modified wheat protein isolate that possess non-viscoelastic characteristics. Examples of desirable additional proteinacious materials for the invention include soy protein isolate, whey protein isolate, milk protein isolate, calcium caseinate, sodium caseinate, soy protein concentrate, textured wheat protein, textured vegetable protein, whey protein concentrate, rice protein concentrate, egg protein, zein, wheat protein concentrate, denatured proteins, gluten, oil seed proteins, hydrolyzed proteins, cheese, textured proteins, fish protein, amino acids, peptides, collagen, casein, animal protein, single cell protein, flax protein, flax meal, and other raw materials having a protein content of greater than 25%. Examples of fats that can be used in the invention include vegetable oils, legume oils, lecithin, butter, cheese curds, natural cheese, process cheese, shortening, or other materials with a percent fat greater than 33% measured on a dry basis. Examples of carbohydrates that can be used in the invention include, but are not limited to, fiber, gums, starches, pregelatinized starches, crystalline starches, powdered flavors, spices, herbs, texturizing agents, beta glucan-based materials, corn masa, modified flour, dried potato material, grain flours, legume flour, seed meal, seeds, vegetable matter, and other CHO compounds. Other proteins and fats could also be used. The above are preferred, because they are widely available commercially, and also contribute to the final products' desirable nutritional profile and/or taste.

The invention consists generally of the following: mixing of the non-viscoelastic modified wheat protein and other proteinaceous material(s), fat (s), desired/selected carbohydrate(s) (if any), and water (and steam if necessary), in a mixing vessel and/or extruder barrel (or preconditioner) to form a soft/moist, extensible, non-sticky dough. The dough is then extruded through a die (and cut to a desired shape and size) and/or transferred to a sheeting, lamination sheeting, or rotary molding process, followed by the reduction and transformation of the raw dough into the desired shape and thickness, for processing into the final product. Optionally, this can be followed by the cutting/forming of the dough into the desired end product shape and size through the utilization of a cutting die or rotary cutter or guillotine cutting system. The product is then transferred to a tunnel oven, drying, microwaving, frying (including vacuum frying), steaming, or boiling process, or combination two or more of such, at temperatures less than 900° F. but greater than 100° F. The product is processed in this manner until the final item reaches the desired moisture percentage of less than 25%, with the preferred moisture content level being from 1% to 20%.

In the preferred embodiments, the mixture ratios of proteins, proteinaceous materials, fats, and carbohydrates, to final product weight can be modified for increased or decreased final nutritional levels as well as functional properties of the food material. However, the ratio of the modified wheat protein to final product weight must be maintained at greater than 5% and less than 50%, with the preferred being 7% to 45%. Mixing of the proteins, fats, and select carbohydrates is preferably accomplished by adding all components directly into a single chamber, mixing by a single or double arm mixing device (including a ribbon blender) or by direct feed mixing in the barrel of an extruder, and mixing/blending until thoroughly integrated. The water percentage of the dough mixture will vary according to ingredients, protein composition, type of protein, solubility of protein, fat percentage, temperature of surrounding environment, and method of processing. The preferred water to solids mixture is from 1:1 to 1:5. The final dough product will be solid enough to be reduced to a solid sheet or molded item or extruded product, utilizing the sheeting, molding, and extrusion process equipment, with a thickness of greater than 0.10 mm and less than 300 mm, without sheer adhesion to the reduction rollers, rotary molding system, or extrusion screw/barrel/die head unit. Optionally, for varied sheer requirements, the equipment systems may be coated with a non-stick coating, such as Teflon or lecithin based anti-adhesion product, to avoid friction induced dough adhesion. The final formed and cut proteinaceous food items are then processed through baking, drying, frying, microwaving, steaming, boiling, or a combination of such, for moisture reduction. The final moisture content should be 1% to 7% for shelf stable products such as chips, bars, snacks, crackers, wafers, flat breads, cookies, pasta, biscuits, cereals, with a preferred 2%-6.5% to avoid scorching and burning. The final moisture content should be 3%-30% for breads, bagels, cakes, pastries, french fries, meat analogs, food pellets, and doughnuts. Higher quantities of moisture reduce the shelf stability. Topical seasonings, icings, coatings and/or oils/fats may then be added to the protein food product for increased flavor.

The use of this extensible dough with existing equipment in a commercial bakery, extrusion, pasta, or snack food plant allows for high volume production of a product that is traditionally difficult to produce at economical costs due to the fragility and lack of extensibility of protein dough products.

This invention features an extensible, pliable, non-viscoelastic, proteinaceous, reduced carbohydrate dough material for the production of fabricated, reduced carbohydrate proteinaceous foods, comprising a modified wheat protein isolate, at least one additional proteinaceous ingredient, and water, wherein the ingredients are mixed together to form the dough material.

The modified wheat protein isolate is preferably modified to achieve broken disulfide bonding providing a non-viscoelastic characteristic to the protein. The modified wheat protein may possess a protein content of greater than 70% calculated as nitrogen×6.25. The modified wheat protein may be a wheat protein isolate with a carbohydrate percentage no more than 25%, ash percentage no more than 2%, and fat content no more than 3%. The modified wheat protein may have an average molecular weight of less than 100,000. The modified wheat protein may be film forming. The modified wheat protein may be highly refined and sodium metabisulfite-modified wheat gluten. The modified wheat protein may constitute from about 5% to about 50% by weight of the final product.

The additional proteinaceous material may comprise one or more proteins including but not limited to soy protein isolate, whey protein isolate, milk protein isolate, calcium caseinate, sodium caseinate, soy protein concentrate, textured wheat protein, textured vegetable protein, whey protein concentrate, rice protein concentrate, egg protein, zein, wheat protein concentrate, denatured proteins, gluten, oil seed proteins, hydrolyzed proteins, cheese, textured proteins, fish protein, amino acids, peptides, collagen, casein, animal protein, single cell protein, flax protein, flax meal, and other raw materials having a protein content of greater than 25%.

The dough material may further comprise one or more select carbohydrates, one or more fats, one or more emulsifying agents, and one or more flavors. The dough material may further comprise one or more leavening agents. The dough material may have a reduced carbohydrate profile of less than 70% of the dough by dry weight. The dough material may be at least partially processed by one or more of the following processes: direct reduction sheeting, lamination sheeting, rotary molding, die cutting, baking, drying, microwaving, frying, steaming, boiling, and extrusion.

The invention also features a fabricated proteinaceous food product made from this dough material. The food product may comprise greater than 25% by dry weight protein. The food product may be selected from the group of food products consisting of chips, bars, snacks, crackers, wafers, flat breads, cookies, biscuits, breads, bagels, cakes, french fries, meat analogs, pasta, pastries, breakfast cereals, pancakes, waffles, pizza dough, muffins, and doughnuts. The food product may further comprise a topical seasoning/coating. The food product may further comprise an enrobed covering.

DESCRIPTION OF THE PREFERRED EMBODIMENTS

This invention features an extensible, proteinaceous formulation of modified wheat protein, proteinaceous materials/concentrates/isolates, fats/oils, and less than 75% select carbohydrates having controlled break elongation functional characteristics; the blending of such ingredients in a mixer; the conversion to an extensible reduced carbohydrate, high protein dough through the addition of water and thorough mixing; the transfer, reduction and/or molding of the dough to a desired thickness and shape through extrusion and die cutting and/or reduction sheeting and/or lamination sheeting processes and die cutting, direct deposit, and/or rotary molding (e.g., rotary piston molding); followed by baking, drying, microwave, frying, steaming, boiling, or a combination of such for desired moisture reduction and proteinaceous matrix curing/setting, with the option of topical seasoning/coating of the final product.

The invention consists generally of the following: mixing of a reduced carbohydrate protein blend consisting of modified wheat protein(s) and proteinaceous concentrates and/or isolates, and/or fats and oils, and/or lecithin, and/or select carbohydrate materials, if desired for flavor and/or texture and/or seasoning and/or bulking and/or gelatinization; the addition of water to the blend to form a soft, extensible, cohesive, non-adhesive dough; followed by the transfer of the moist yet solid dough to an extrusion, reduction sheeter system, lamination sheeting, direct deposit, and/or rotary molding system, for final product depositing or dough forming/sheeting/molding to a thickness from 300 mm to 0.10 mm. The reduced thickness dough is then optionally processed by a die cutting device for the cutting/formation of the protein chips, bars, snacks, crackers, wafers, flat breads, cookies, biscuits, breads, bagels, cakes, french fries, meat analogs, pasta, pastries, and doughnuts. The extruded dough can optionally be combined with another product such as a fruit paste, and/or the individual cut/deposited unit items can be placed directly onto a conveyor band. The items are then transferred to a moisture-reduction process, including baking, drying, microwaving, frying, steaming, boiling, or a combination of such, until the extensible protein based food reaches the desired moisture percentage for durable handling strength, shelf stability, texture, flavor, and crunch. The final fabricated proteinaceous food can then be optionally seasoned, flavored, layered, and/or enrobed with a topical seasoning and/or coating, and then packaged.

The following tables illustrate the elongation of the inventive dough that allows it to be processed on small kitchen and industrial-scale food processing equipment designed for processing carbohydrate-based products.

The three doughs were prepared using the sodium metabisulfite, chemically modified, non-viscoelastic, film forming wheat protein isolate FP 5000 from Midwest Grain Products labeled "W". This product has 90% minimum protein (N×6.25), 4% maximum ash, 7% maximum moisture, 2% maximum fat, 1% maximum fiber, and 5% maximum starch. It has an average molecular weight of less than 100,000 Daltons. The doughs also include a common soy protein isolate Profam 781 from Archer Daniels Midland labeled "S", and a common vegetable oil labeled "O" and room temperature process water labeled "PW" under standard room temperature (70°-78° F.) conditions.

| Formulation | Break Elongation (%) |
|---|---|
| 11% W, 35% S, 14% O, 40% PW | 38.45 |
| 11% W, 35% S, 14% O, 40% PW | 35.73 |
| 11% W, 35% S, 14% O, 40% PW | 56.56 |
| 11% W, 35% S, 14% O, 40% PW | 25.23 | mean = 38.99

TABLE 2

| Formulation | Break Elongation (%) |
|---|---|
| 23% W, 23% S, 14% O, 40% PW | 143.67 |
| 23% W, 23% S, 14% O, 40% PW | 81.19 |
| 23% W, 23% S, 14% O, 40% PW | 116.31 | mean = 113.72

TABLE 3

| control | |
|---|---|
| Formulation | Break Elongation (%) |
| 0% W, 47 % S, 14% O, 40% PW | 3.38 |
| 0% W, 47 % S, 14% O, 40% PW | 4.21 |
| 0% W, 47 % S, 14% O, 40% PW | 7.59 |
| 0% W, 47 % S. 14% O, 40% PW | 5.73 | mean = 5.23

As is evident, the use of at least 11% modified wheat protein isolate dramatically increases the break elongation functional characteristics of the proteinaceous dough, thus allowing it to have properties necessary for many industrial/commercial processes.

The following examples illustrate the inventive products and process parameters.

EXAMPLE 1

100 parts modified wheat protein isolate (90% protein), 130 parts soy protein isolate (90% protein) were placed in a stainless steel single arm dough mixer. The powders were blended together for 1 minute at medium speed. 10 parts liquid lecithin and 10 parts vegetable oil was then added directly to the powder blend and mixed at high speed for 2 minutes. 24 parts water (60-72° F.) was added directly to the dough and blended at high speed for 3 minutes. 5 parts ammonia bicarbonate was then added to the wet dough (for leavening of the product in the oven) and blended in for an additional 3 minutes. The final pliable extensible protein dough product was then transferred to a flat service and reduction sheeted to a thickness of 2 mm and cut into rectangular shapes. The cut crackers were then placed on into a convection oven, without any overlap, and baked for 10 minutes at temperatures of 330° F. to 350° F.

Final unseasoned rectangular cracker composition was approximately 2.0% moisture, 75% protein, 10% fat, and 3% carbohydrate per 28 gram serving.

EXAMPLE 2

40 parts milled textured wheat protein powder (75% protein), 80 parts modified wheat protein isolate (90% protein), 80 parts soy protein isolate (90% protein), 10 parts deactivated yeast protein concentrate (50% protein), 15 parts pregelatinized starch, 5 parts double acting baking powder, 5 parts lecithin, and 5 parts lecithin powder were placed in a single arm dough mixer. The powders were blended together for 1 minute at medium speed. 15 parts water (60-80° F.) was added directly to the dough and blended at high speed for 3 minutes. The final dough product was then rolled to a thickness of approximately 2 mm and cut into triangular shaped chips. The cut chips were then placed on a baking tray, without any overlap, and baked in a convection oven at 320° F. for approximately 5 minutes for moisture reduction/drying. The dried reduced moisture chips were then transferred to a deep fryer and fried in 360° F. vegetable oil for 2 minutes.

Final unseasoned chip composition was approximately 2% moisture, 56% protein, 25% fat, and 10% carbohydrates per 28 gram serving.

EXAMPLE 3

160 parts textured wheat protein powder (75% protein), 140 parts modified wheat protein isolate (90% protein), and 140 parts soy protein isolate (90% protein), 60 parts egg protein, and 10 parts lecithin powder, were placed in a single arm dough mixer. The powders were blended together for 1 minute at medium speed. 250 parts water (60-80° F.) was added directly to the dough and blended at high speed for 3 minutes. The final dough product was then rolled to a thickness of approximately 2 mm and cut into triangular shaped chips. The cut chips were then placed in a convection oven, without any overlap, and baked at 350° F. for approximately 8-10 minutes.

Final unseasoned chip composition was approximately 2.0% moisture, 76% protein, 8% carbohydrate, and 8% fat per 28 gram serving.

EXAMPLE 4

80 parts textured wheat protein powder (75% protein), 220 parts modified wheat protein isolate (90% protein), and 140 parts soy protein isolate (90% protein), and 10 parts lecithin powder, were placed in a single arm dough mixer. The powders were blended together for 1 minute at medium speed. 30 parts vegetable oil and 250 parts water (60-80° F.) was added directly to the dough and blended at high speed for 3 minutes. The final dough product was then rolled to a thickness of approximately 2 mm and cut into triangular shaped chips. The cut chips were then placed in a convection oven and baked at 320° F. for approximately 5 minutes for moisture reduction. The product was then transferred to a deep frying unit and fried in canola oil at 360° F. for less than 2 minutes.

Final composition of the unseasoned chips was approximately 2.0% moisture, 54% protein, 25% fat, and 4% carbohydrate per 28 gram serving.

EXAMPLE 5

40 parts textured wheat protein powder (75% protein), 110 parts modified wheat protein isolate (90% protein), 70 parts soy protein isolate (90% protein), 20 parts deactivated yeast protein concentrate (50% protein), 5 parts leavening, 50 parts vegetable oil, and 5 parts lecithin powder, were placed in a single arm dough mixer. The ingredients were blended together for 1 minute at medium speed. 15 parts water (60-80° F.) was added directly to the dough and blended at high speed for 3 minutes. The final dough product was then rolled to a thickness of approximately 1.5 mm and cut into triangular shaped chips. The cut chips were then placed in a convection oven at 335° F. for approximately 8-10 minutes.

Final composition of the unseasoned chips was approximately 2.0% moisture, 71% protein, 20% fat, and 8% carbohydrates per 28 gram serving.

EXAMPLE 6

50 parts viscoelastic wheat protein isolate (88% protein), 30 parts modified wheat protein isolate (90% protein), 20 parts soy protein concentrate (70% protein), 1 part deactivated yeast protein concentrate (50% protein), 100 parts potato granule, 5 parts double acting baking powder, 5 parts lecithin, and 5 parts lecithin powder, were placed in a single arm dough mixer. The powders were blended together for 1 minute at medium speed. 16 parts water (60-80° F.) was added directly to the dough and blended at high speed for 3 minutes. The final dough product was then rolled to a thickness of approximately 20 mm and cut into shoestring french fries. The cut strips were then placed in a convection oven at 320° F. for approximately 5 minutes for moisture reduction/drying. The dried reduced moisture shoestring french fry snack was then transferred to a deep fryer and fried in 360° F. vegetable oil for 2 minutes.

Final shoestring french fry snack composition was approximately 2% moisture, 29% protein, 23% fat, 29% carbohydrates per 28 gram serving.

EXAMPLE 7

50 parts viscoelastic wheat protein isolate (88% protein), 30 parts modified wheat protein isolate (90% protein), 50 parts soy protein concentrate (70% protein), 0.5 part deactivated yeast protein concentrate (50% protein), 100 parts corn masa, and 5 parts lecithin powder, were placed in a single arm dough mixer. The powders were blended together for 1 minute at medium speed. 16 parts water (60-80° F.) was added directly to the dough and blended at high speed for 3 minutes. The final dough product was then rolled to a thickness of approximately 1.5 mm and cut into rectangular strips. The cut strips were then directly deep fried in canola oil for 4 minutes.

Final corn chip snack composition was approximately 3% moisture, 32% protein, 25% fat, 28% carbohydrates per 28 gram serving.

EXAMPLE 8

50 parts viscoelastic wheat protein isolate (88% protein), 30 parts modified wheat protein isolate (90% protein), 20 parts soy protein concentrate (70% protein), 1 part deactivated yeast protein concentrate (50% protein), 100 parts potato granule, 5 parts double acting baking powder, 5 parts lecithin, and 5 parts lecithin powder, were placed in a single arm dough mixer. The powders were blended together for 1 minute at medium speed. 16 parts water (60-80° F.) was added directly to the dough and blended at high speed for 3 minutes. The final dough product was then rolled to a thickness of approximately 20 mm and cut into round chips. The cut strips were then placed in a convection oven at 320° F. for approximately 5 minutes for moisture reduction/drying. The dried reduced moisture potato chip snack was then transferred to a deep fryer and fried in 360° F. vegetable oil for 2 minutes.

Final potato chip snack composition was approximately 2% moisture, 29% protein, 23% fat, 29% carbohydrates per 28 gram serving.

EXAMPLE 9

140 pounds textured wheat protein (75% protein), 360 pounds modified wheat protein isolate (90% protein), 396 pounds soy protein isolate (90% protein), 40 pounds lecithin, 40 pound safflower oil, and 4 pounds of masking agent (Sucralose), were placed in a 2000 pound single arm dough mixer. Mixer was started and 750 pounds of water (77° F.) was added directly to the dough and blended at low speed for an additional 5 minutes after water was added. The final dough product was then transferred to a large industrial scale vertical lamination/sheeting unit. The material was reduced to a thick 200 mm sheet, reduced further, then laminated, and further reduced in thickness through reduction rolls, where it was completed at a thickness of approximately 1 mm. The product was then dockered and die cut into potato chip shaped roundish chips. The cut chips were then transferred to a direct fire 275' oven and baked for 2.40 minutes at temperatures ranging from 250 to 485° F. The baked product was then further dried in a radio frequency drying oven followed by topical oiling and seasoning.

Final protein chip snack composition was approximately 2% moisture, 64% protein, 18% fat, 11% carbohydrates per 28 gram serving.

EXAMPLE 10

7 parts textured wheat protein (75% protein), 7 parts modified wheat protein isolate (90% protein), 11 parts whey protein concentrate (80% protein), 1 part lecithin, 1 part rice bran oil, 0.1 parts ammonia bicarbonate, and 0.1 parts masking agent (Sucralose), were placed in a single arm dough mixer. Mixer was started and 10 parts of water (77° F.) was added directly to the blend and mixed at low speed for an additional 5 minutes after water was added. The final dough product was then transferred to a sheeting unit and rolled to a thickness of approximately 10 mm and die cut into rectangular bar shaped products. The cut bars were then transferred to a convection oven and baked for 7 minutes at temperatures ranging from 250 to 485° F. The final baked product was then enrobed in compound protein rich chocolate.

Final protein bar composition was approximately 2% moisture, 67% protein, 17% fat, 13% carbohydrates per 30 gram bar.

EXAMPLE 11

7 parts modified wheat protein isolate (90% protein), 14 parts whey protein concentrate (80% protein), 1 part lecithin, 1 part rice bran oil, 0.1 parts ammonia bicarbonate, and 0.1 parts masking agent (Sucralose), were placed in a single arm dough mixer. Mixer was started and 7 parts water (72° F.) was added directly to the blend and mixed at low speed for an additional 5 minutes after water was added. The final dough product was left sitting for 10 minutes and remixed, breaking the dough into pieces and thus forming a blend dough particles. The broken dough was then transferred to a sheet, in a thin layer, and then transferred to a convection oven and baked for 7 minutes at temperatures ranging from 250 to 485° F. The final baked product was then further disturbed and broken via tumbling and packaged as a protein trail mix.

Final protein trail mix composition was approximately 2% moisture, 75% protein, 7% fat, 11% carbohydrates per 28 gram serving.

EXAMPLE 12

3 parts modified wheat protein isolate, 10 parts textured wheat protein, and 11 parts casein were blended in a single arm mixing vessel. 6.5 parts water, 2 parts rice bran oil, 2 parts lecithin, 0.20 parts Sucralose, and 0.10 parts emulsifying agent were added to dry blend and mixed thoroughly. The proteinaceous dough was then transferred to a dockered UHMW polymeric die mold where the product was molded into several bars. The bars were then placed on a sheet and placed in a convection oven at 350 degrees for 10 minutes and then transferred to another convection at 250 degrees for final moisture removal.

Final rotary molded protein bar is 72% protein, 6% carbohydrate, and 12% fat.

EXAMPLE 13

50 parts non-viscoelastic wheat protein isolate (Arise 6000, 85% protein), 200 parts sweetened non-gelling composite wheat-egg-soy protein (Beta 3000, 85% protein), 65 parts palm kernel oil, and 5 parts lecithin, were placed in a single arm dough mixer. The powders were blended together for 1 minute at medium speed. 140 parts water (70-75° F.) was added directly to the dry mix and blended at high speed for 3 minutes. The final dough product was then transferred to the barrel of a dough extruder. The soft dough was then extruded through a double ¾" tape die to form two proteinaceous tapes in a thickness of approximately 5 mm. The tape was guillotined at 4" lengths to form rectangular strips. The cut strips were then placed onto a metal sheet, then placed into convection oven and dried for 6 minutes at 350° F.

Final extruded cookie bar snack composition was approximately 5% moisture, 66% protein, 22% fat, 6% carbohydrates per 32 gram serving.

Materials of importance used for these examples include wheat protein isolates (Arise 5000, Arise 6000, both from MGP, Atchison, Kans.); soy protein isolates (ProFam 781, Profam 985, Profam 891, products of ADM, Decatur, Ill.); whey protein isolate and concentrate (both from Proteint, St. Paul, Minn.); textured wheat protein powder (MGP, Atchison, Kans.); viscoelastic wheat gluten protein (Prolite Wheat Gluten, ADM, Decatur, Ill.); sweetened composite protein (Beta 3000, Betafoods, Natick, Mass.)

Each of the above features of the invention may be combined within the scope of the invention as understood by those skilled in the art. Other embodiments will occur to those skilled in the art and are within the scope of the following claims.

What is claimed is:

1. A highly-extensible, high protein reduced carbohydrate edible composite material for the production of fabricated, reduced carbohydrate proteinaceous foods, comprising:
   a film-forming modified wheat protein isolate having a protein content of greater than 70% calculated as nitrogen ×6.25, in which the modified wheat protein isolate constitutes at least about 10% and no more than about 50% by weight of the edible composite material;
   at least one additional proteinaceous ingredient; and
   water;
   wherein the ingredients are mixed together to form a highly-extensible edible composite material exhibiting a sufficiently high average break elongation such that the composite material is capable of being processed by extrusion, sheeting or molding operations that require extensibility.

2. The edible composite material of claim 1 wherein the modified wheat protein isolate is modified to achieve broken disulfide bonding providing a non-viscoelastic characteristic to the protein.

3. The edible composite material of claim 1 wherein the modified wheat protein isolate is a wheat protein isolate with a carbohydrate content of no more than 25%, ash content of no more than 5%, and fat content of no more than 5%.

4. The edible composite material of claim 1 wherein the modified wheat protein isolate has an average molecular weight of less than 100,000.

5. The edible composite material of claim 1 wherein the modified wheat protein isolate is refined and sodium metabisulfite-modified wheat gluten.

6. A fabricated proteinaceous food product made from the edible composite material of claim 1.

7. The edible composite material of claim 1, further comprising at least one carbohydrate, at least one fat, at least one emulsifying agent, and at least one flavor.

8. The edible composite material of claim 7 further comprising at least one leavening agent.

9. The edible composite material of claim 7, wherein the edible composite material has a reduced carbohydrate profile of less than 70% of the edible composite by dry weight.

10. The food product of claim 6, wherein the edible composite material is at least partially processed by a process selected from the group of processes consisting of direct reduction sheeting, lamination sheeting, rotary molding, die cutting, dockering, baking, drying, microwaving, frying, steaming, boiling, and extrusion.

11. The food product of claim 6 wherein the food product is selected from the group of food products consisting of chips, bars, snacks, crackers, wafers, flat breads, cookies, biscuits, breads, bagels, cakes, french fries, meat analogs, pasta, pastries, breakfast cereals, pancakes, waffles, pizza dough, muffins, and doughnuts.

12. The food product of claim 11 further comprising a topical seasoning/coating.

13. The food product of claim 12 further comprising an enrobed covering.

14. The edible composite material of claim 1 wherein the additional proteinaceous ingredient comprises soy protein isolate.

15. The edible composite material of claim 1 wherein the additional proteinaceous ingredient comprises a non-gelling composite protein.

16. The edible composite material of claim 1 wherein the additional proteinaceous material is selected from the group consisting of milk protein isolate, calcium caseinate, sodium caseinate, soy protein concentrate, textured wheat protein, textured vegetable protein, whey protein concentrate, rice protein concentrate, egg protein, zein, wheat protein concentrate, denatured proteins, gluten, oil seed proteins, hydrolyzed proteins, cheese, textured proteins, fish protein, amino acids, peptides, collagen, casein, animal protein, single cell protein, flax protein, flax meal, and other raw materials having a protein content of greater than 25%.

17. A highly-extensible, high protein reduced carbohydrate edible composite material for the production of fabricated, reduced carbohydrate proteinaceous foods, comprising:
   a high-protein film-forming modified wheat protein isolate;
   at least one additional proteinaceous ingredient; and
   water;
   wherein the ingredients are mixed together to form a highly-extensible edible composite material comprising at least about 39% by dry weight protein, the edible composite material exhibiting a sufficiently high average break elongation such that the composite material is capable of being processed by extrusion, sheeting or molding operations that require extensibility.

18. The edible composite material of claim 1 wherein the highly-extensible edible composite material is rolled to reduce its thickness to from 1-20 mm, and cut into desired shapes.

19. The edible composite material of claim 1 comprising at least 39% by dry weight protein.

* * * * *